(12) United States Patent
Chilukuri et al.

(10) Patent No.: US 11,802,523 B2
(45) Date of Patent: Oct. 31, 2023

(54) MULTI-LOBED BULLNOSE RAMP (71) Applicant: ROHR, INC., Chula Vista, CA (US)

(72) Inventors: Radhakrishna Chilukuri, San Diego, CA (US); Hussain Mahamed Javed Tapadar, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/501,862

(22) Filed: Oct. 14, 2021

(65) Prior Publication Data

US 2022/0186683 A1 Jun. 16, 2022

(30) Foreign Application Priority Data

Dec. 12, 2020 (IN) .............................. 202011054154

(51) Int. Cl.
*F02K 1/72* (2006.01)
(52) U.S. Cl.
CPC .......... *F02K 1/72* (2013.01); *F05D 2220/323* (2013.01); *F05D 2270/051* (2013.01)
(58) Field of Classification Search
CPC ........ F02K 1/70; F02K 1/72; F05D 2240/127; F05D 2220/323; F05D 2270/051
See application file for complete search history.

(56) References Cited

U.S. PATENT DOCUMENTS

| 7,690,190 | B2 | 4/2010 | Thornock et al. | |
|---|---|---|---|---|
| 9,371,799 | B2 | 6/2016 | Packard et al. | |
| 2011/0174899 | A1* | 7/2011 | Vauchel | F02K 1/805 |
| | | | | 239/265.11 |
| 2015/0107221 | A1* | 4/2015 | Aten | F02K 1/625 |
| | | | | 60/226.2 |
| 2015/0308376 | A1 | 10/2015 | James | |
| 2018/0298918 | A1* | 10/2018 | Terauchi | F23R 3/46 |
| 2020/0400096 | A1* | 12/2020 | McEvoy | F02K 1/805 |

FOREIGN PATENT DOCUMENTS

| EP | 2863038 | 4/2015 |
|---|---|---|
| EP | 2937548 | 10/2015 |

OTHER PUBLICATIONS

European Patent Office; European Search Report dated Apr. 25, 2022 in Application No. 21214174.1.

* cited by examiner

*Primary Examiner* — Andrew H Nguyen
(74) *Attorney, Agent, or Firm* — SNELL & WILMER L.L.P.

(57) ABSTRACT

A bullnose ramp is disclosed. In various embodiments, the bullnose ramp includes a forward portion, the forward portion characterized by a first profile; an aft portion, the aft portion characterized by a second profile; and a transition portion positioned proximate an intersection between the forward portion and the aft portion, the transition portion defining a change in slope between the first profile and the second profile.

20 Claims, 5 Drawing Sheets

MULTI-LOBED BULLNOSE RAMP

CROSS-REFERENCE TO RELATED APPLICATIONS

This application claims priority to, and the benefit of, India Patent Application No. 202011054154, filed Dec. 12, 2020 and titled "MULTI-LOBED BULLNOSE RAMP," which is incorporated herein by reference in its entirety for all purposes.

FIELD

The present disclosure relates generally to aircraft propulsion systems and, more particularly, to thrust reversers used in aircraft propulsion systems.

BACKGROUND

Aircraft propulsion systems that employ gas turbine engines for thrust typically include a thrust reverser configured to regulate a bypass flow stream within a bypass duct of the gas turbine engine. The thrust reverser defines a forward-thrust configuration, in which the bypass flow stream is employed to generate thrust in a forward direction, and a reverse-thrust configuration, in which the bypass flow stream is employed to generate thrust in a reverse direction that is opposite the forward direction.

Placing the thrust reverser in the reverse-thrust configuration generally redirects the bypass flow stream through a thrust reverser duct located radially outward of the bypass duct. The redirection typically includes a significant change in the direction of flow of the bypass flow stream. In order to control the change in direction of the flow, a bullnose ramp or fairing may be utilized to define an inner curvature of the directional change.

In order to provide a desired level of performance of the thrust reverser (or a desired magnitude of the reverse-thrust) it may be desirable to design the thrust reverser such that a boundary layer fluid flow within a boundary layer that is adjacent to the bullnose fairing does not separate from the bullnose fairing. Thus, the inner curvature that is defined by the bullnose ramp or fairing may be dictated by a desired mass flow rate of the bypass flow stream through the reverser duct, a desired average velocity of the bypass flow stream through the reverser duct or the desired magnitude of the reverse-thrust.

SUMMARY

A bullnose ramp for use in a thrust reverser is disclosed. In various embodiments, the bullnose ramp includes a forward portion, the forward portion characterized by a first profile; an aft portion, the aft portion characterized by a second profile; and a transition portion positioned proximate an intersection between the forward portion and the aft portion, the transition portion defining a change in slope between the first profile and the second profile.

In various embodiments, the change in slope between the forward portion and the aft portion is represented by a discontinuity. In various embodiments, the discontinuity extends between the forward portion and the aft portion at an essentially constant axial position with respect to an axial direction. In various embodiments, the forward portion is configured to induce separation of a bypass flow stream from a surface of the bullnose ramp and the aft portion is configured to induce reattachment of the bypass flow stream to the surface of the bullnose ramp In various embodiments, the first profile is a first sinuous profile with respect to an axial direction. In various embodiments, the second profile is a second sinuous profile with respect to the axial direction. In various embodiments, the first sinuous profile is characterized by a first curvature profile, the first curvature profile extending from a forward axial position of the bullnose ramp to the discontinuity. In various embodiments, the second sinuous profile is characterized by a second curvature profile, the second curvature profile extending from the discontinuity to an aft axial position of the bullnose ramp. In various embodiments, the first curvature profile is characterized by a first set of curvature values, the second curvature profile is characterized by a second set of curvature values, and the second set of curvature values is lesser in magnitude than the first set of curvature values.

A thrust reverser is disclosed. In various embodiments, the thrust reverser includes a cascade; and a bullnose ramp disposed in an axial direction upstream of the cascade, the bullnose ramp comprising a forward portion, the forward portion characterized by a first profile, an aft portion, the aft portion characterized by a second profile, and a transition portion positioned proximate an intersection between the forward portion and the aft portion, the transition portion defining a change in slope between the first profile and the second profile.

In various embodiments, the change in slope between the forward portion and the aft portion is represented by a discontinuity in at least one of the change in slope or a rate of change in the change in slope. In various embodiments, the discontinuity extends between the forward portion and the aft portion at an essentially constant axial position with respect to the axial direction. In various embodiments, the forward portion is configured to induce separation of a bypass flow stream from a surface of the bullnose ramp and the aft portion is configured to induce reattachment of the bypass flow stream to surface of the bullnose ramp.

In various embodiments, the first profile is a first sinuous profile with respect to the axial direction and the first sinuous profile is characterized by a first curvature profile, the first curvature profile extending from a forward axial position of the bullnose ramp to the discontinuity. In various embodiments, the second profile is a second sinuous profile with respect to the axial direction and wherein the second sinuous profile is characterized by a second curvature profile, the second curvature profile extending from the discontinuity to an aft axial position of the bullnose ramp. In various embodiments, the first curvature profile is characterized by a first set of curvature values, the second curvature profile is characterized by a second set of curvature values, and the second set of curvature values is lesser in magnitude than the first set of curvature values.

An assembly for an aircraft propulsion system is disclosed. In various embodiments, the assembly includes a nacelle, the nacelle including a nacelle translating structure; a cascade disposed within a thrust reverser duct; a blocker door configured to block a portion of a bypass flow stream; and a bullnose ramp disposed in an axial direction upstream of the cascade, the bullnose ramp comprising a forward portion, the forward portion characterized by a first axial profile, an aft portion, the aft portion characterized by a second axial profile, and a transition portion positioned proximate an intersection between the forward portion and the aft portion, the transition portion defining a change in slope between the first profile and the second profile.

In various embodiments, the change in slope between the forward portion and the aft portion is represented by a discontinuity in at least one of the change in slope or a rate of change in the change in slope. In various embodiments, the change in slope extends between the forward portion and the aft portion at an essentially constant axial position with respect to the axial direction. In various embodiments, the forward portion is configured to induce separation of a bypass flow stream from a surface of the bullnose ramp and the aft portion is configured to induce reattachment of the bypass flow stream to surface of the bullnose ramp.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
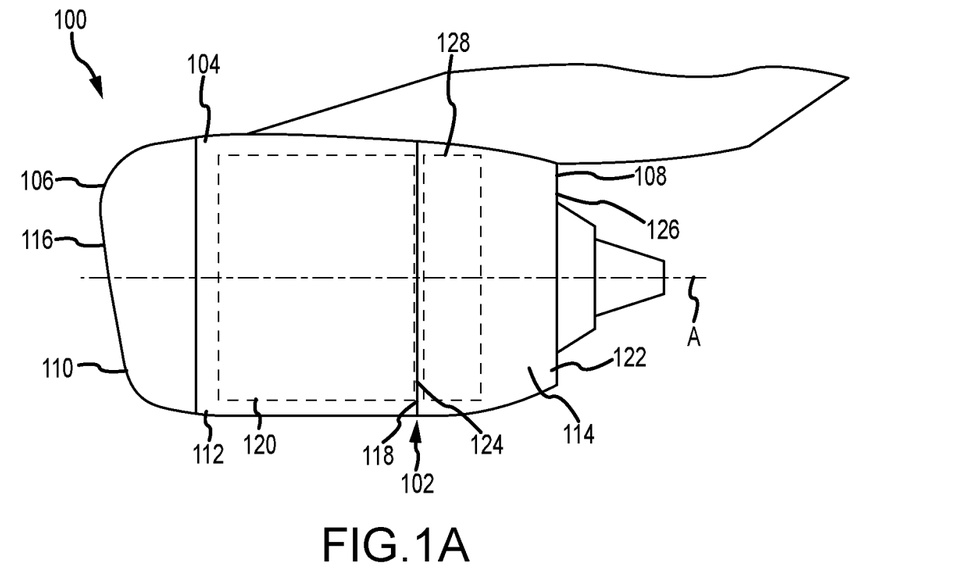
FIGS. 1A and 1B are schematic illustrations of an aircraft propulsion system with a thrust reverser in a stowed position and a deployed position, respectively, in accordance with various embodiments.
Figure 1B:
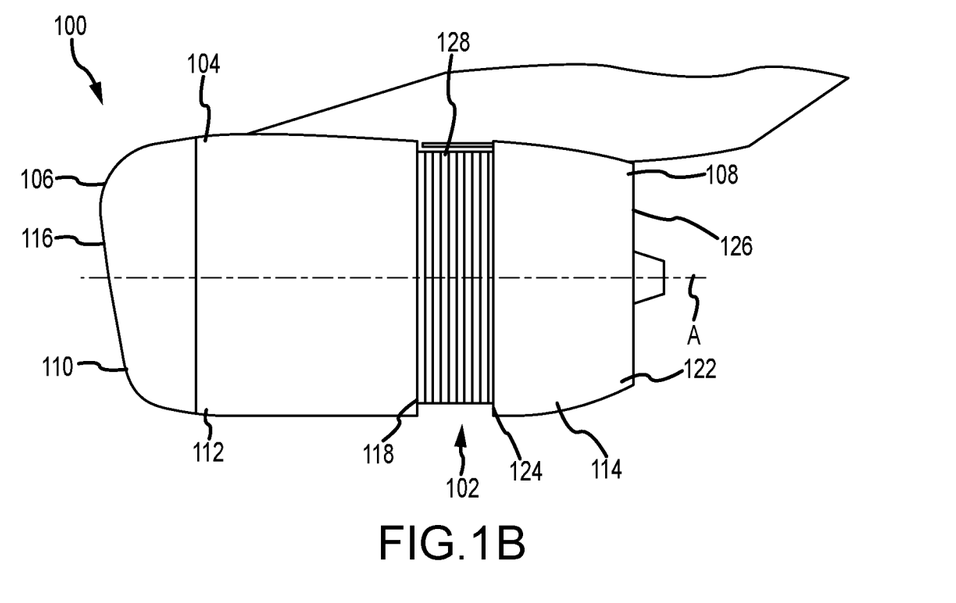

Referring now to the drawings, FIGS. 1A and 1B provide schematic illustrations of an aircraft propulsion system 100 with a thrust reverser 102 in a stowed position and a deployed position, respectively. The aircraft propulsion system 100 includes a nacelle 104 and a gas turbine engine housed within the nacelle 104. Without loss of generality, the gas turbine engine may be configured as a high-bypass turbofan engine or, alternatively, the gas turbine engine may be configured as any other type of gas turbine engine capable of propelling an aircraft during flight. The nacelle 104 is configured to house and provide an aerodynamic cover for the gas turbine engine. An outer structure of the nacelle 104 extends along an axial centerline A (or an axial direction) between a nacelle forward end 106 and a nacelle aft end 108. The nacelle 104 includes an inlet structure 110, one or more fan cowls 112 (e.g., a left-side fan cowl and a right-side fan cowl) and a nacelle aft structure 114, which is configured as part of or may include the thrust reverser 102. The inlet structure 110 is disposed at the nacelle forward end 106. The inlet structure 110 is configured to direct a stream of air through an inlet opening 116 at the nacelle forward end 106 and into a fan section of the gas turbine engine.

Each of the one or more fan cowls 112 is typically disposed axially between the inlet structure 110 and the nacelle aft structure 114. Each of the one or more fan cowls 112 is disposed at (e.g., on, adjacent or proximate) an aft end 118 of a stationary portion of the nacelle 104, and extends forward to the inlet structure 110. Each of the one or more fan cowls 112 is also generally axially aligned with a fan section of the gas turbine engine. The one or more fan cowls 112 are configured to provide an aerodynamic covering for a fan case 120, which circumscribes the fan section and partially forms a forward outer peripheral boundary of a bypass flow stream of the aircraft propulsion system 100. The term "stationary portion" is used above to describe a portion of the nacelle 104 that is stationary during operation of the aircraft propulsion system 100 (e.g., during takeoff, aircraft flight and landing). However, the stationary portion may be otherwise movable, for example, to provide access for inspection or maintenance of the various components that comprise the aircraft propulsion system 100.

The nacelle aft structure 114 includes a translating sleeve 122. The translating sleeve 122 is disposed at the nacelle aft end 108. The translating sleeve 122 extends axially along the axial centerline A (or an axial direction) between a forward end 124 thereof and the nacelle aft end 108. The translating sleeve 122 is configured to partially form an aft outer peripheral boundary of the bypass flow stream. The translating sleeve 122 may also be configured to form a bypass nozzle 126 for the bypass flow stream with an inner fixed structure of the nacelle 104, which nacelle inner fixed structure houses a core of the gas turbine engine. The translating sleeve 122 includes a pair of sleeve segments (e.g., a first translating sleeve segment and a second translating sleeve segment) arranged on opposing sides of the aircraft propulsion system 100 (one such sleeve segment visible in FIGS. 1A and 1B). The present disclosure, however, is not limited to such an exemplary translating sleeve configuration. For example, the translating sleeve 122 may alternatively have a substantially tubular body. For example, in various embodiments, the translating sleeve 122 may extend up to or more than three-hundred and thirty degrees (330°) about the axial centerline A.

Still referring to FIGS. 1A and 1B, the translating sleeve 122 is an axially translatable structure. Each translating sleeve segment, for example, may be slidably connected to one or more stationary structures (e.g., a pylon and a lower bifurcation) through one or more respective track assemblies. Each track assembly may include a rail mated with a track beam; however, the present disclosure is not limited to the foregoing exemplary sliding connection configuration. With the foregoing configuration, the translating sleeve 122 may translate axially along the axial centerline A and relative to the stationary portion. The translating sleeve 122 may thereby move axially between a forward or stowed position (see FIG. 1A) and an aft or deployed position (see FIG. 1B). In the forward or stowed position, the translating sleeve 122 provides the functionality described above. In the aft or deployed position, the translating sleeve 122 at least partially (or substantially completely) uncovers at least one or more other components of the thrust reverser 102 such as, but not limited to, a cascade structure 128. In addition, as the translating sleeve 122 moves from the stowed position to the deployed position, one or more blocker doors (see, e.g., the thrust reverser blocker door assembly 234 illustrated in FIG. 2B) arranged with the translating sleeve 122 may be deployed to divert bypass air from the bypass flow stream through the cascade structure 128 to provide reverse thrust.

Figure 2A:
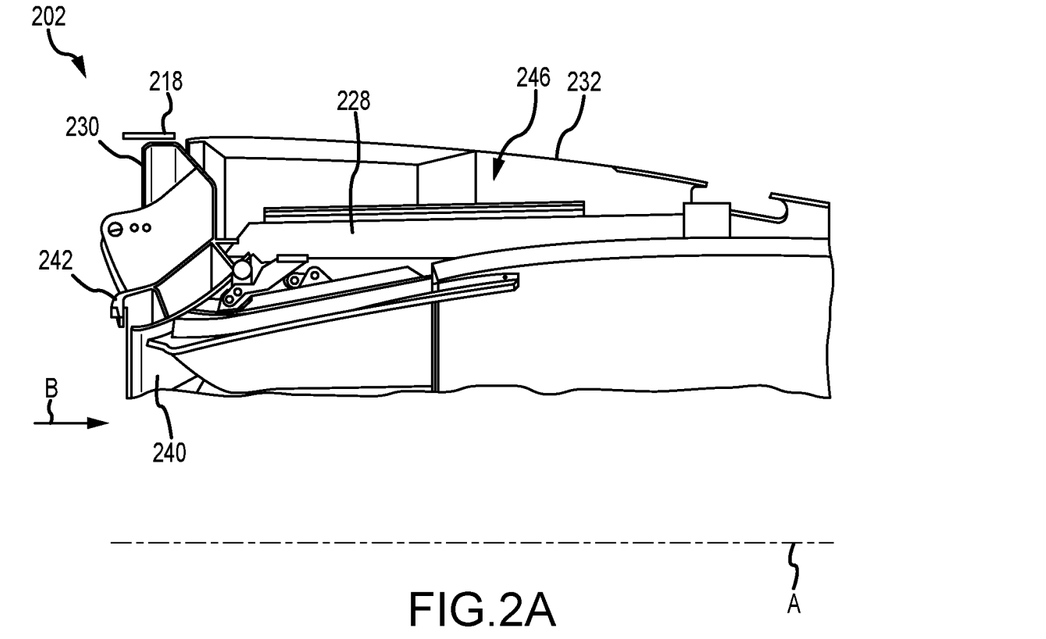
FIGS. 2A and 2B are schematic side-sectional illustrations of a thrust reverse in a stowed position and a deployed position, respectively, in accordance with various embodiments.
Figure 2B:
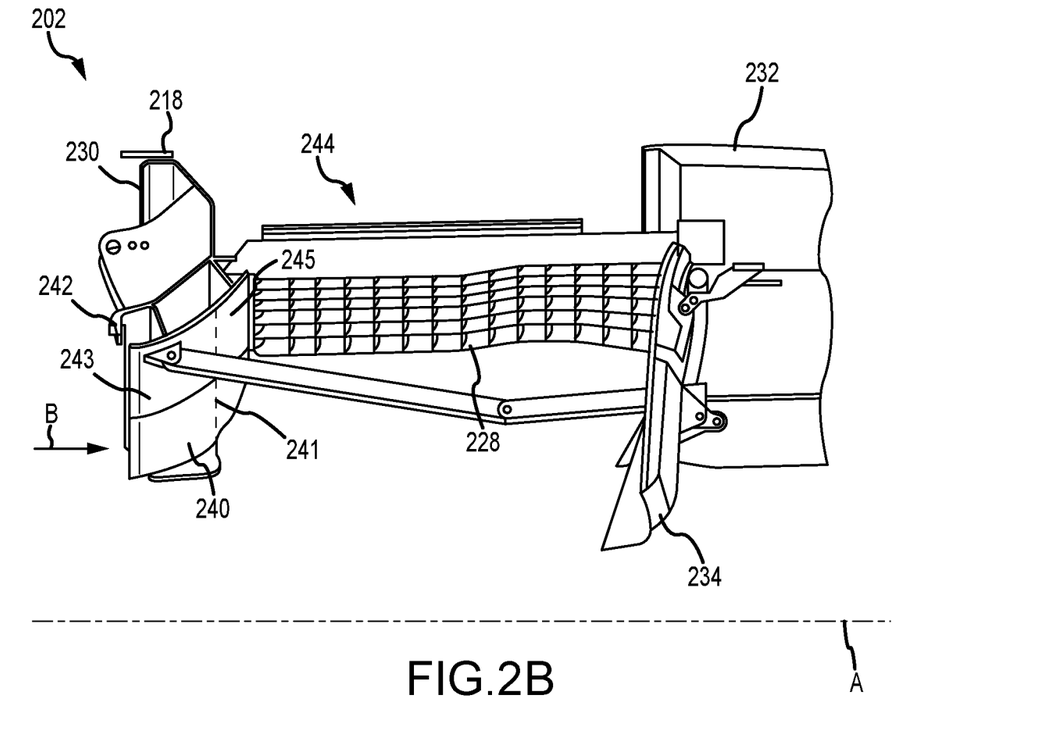

Referring now to FIGS. 2A and 2B, a partial side-sectional illustration of a thrust reverser 202, similar to the thrust reverser 102 described above with reference to FIGS. 1A and 1B, is provided, in both a stowed position (see FIG. 2A) and a deployed position (see FIG. 2B). Without loss of generality, the thrust reverser 202 includes a nacelle fixed structure 230, a nacelle translating structure 232 and a thrust reverser blocker door assembly 234. The nacelle fixed structure 230 is located at an aft end 218 of a stationary portion of a nacelle, such as, for example, the aft end 118 of the stationary portion of the nacelle 104 described above with reference to FIGS. 1A and 1B. Note that while the following disclosure is described in part with reference to the thrust reverser 202 and the thrust reverser blocker door assembly 234, the disclosure contemplates applicability to other types of thrust reversers and blocker door assemblies, including, for example, traditional drag-link style blocker doors mounted on an inner fixed structure. Accordingly, the disclosure should not be construed as limited to the thrust reverser and the related components illustrated at FIGS. 2A and 2B.

The nacelle fixed structure 230 includes a bullnose ramp 240 (or a bullnose) and an internal nacelle support structure 242. Note the term "bullnose" originates from the rounded nose of a bull and typically refers to a smooth, rounded structure or a rounded edge on a surface or object having a smooth, rounded or finished appearance. The bullnose ramp 240 is configured to provide a smooth aerodynamic transition from a bypass flow stream B to a thrust reverser duct 244, which extends axially between the internal nacelle support structure 242 and the nacelle translating structure 232. In various embodiments, the internal nacelle support structure 242 circumscribes and supports the bullnose ramp 240. The internal nacelle support structure 242 also provides a base to which a cascade structure 228, similar to the cascade structure 128 described above with reference to FIGS. 1A and 1B, may be mounted. The cascade structure 228 may thereby project axially aft from the internal nacelle support structure 242 and downstream of the bullnose ramp 240. With such a configuration, when the nacelle translating structure 232 is in the stowed position (see FIG. 2A), the cascade structure 228 is located within an internal cavity 246 of the nacelle translating structure 232. When the nacelle translating structure 232 is in the deployed position (see FIG. 2B), the cascade structure 228 is uncovered and located within the thrust reverser duct 244.

Figure 3:
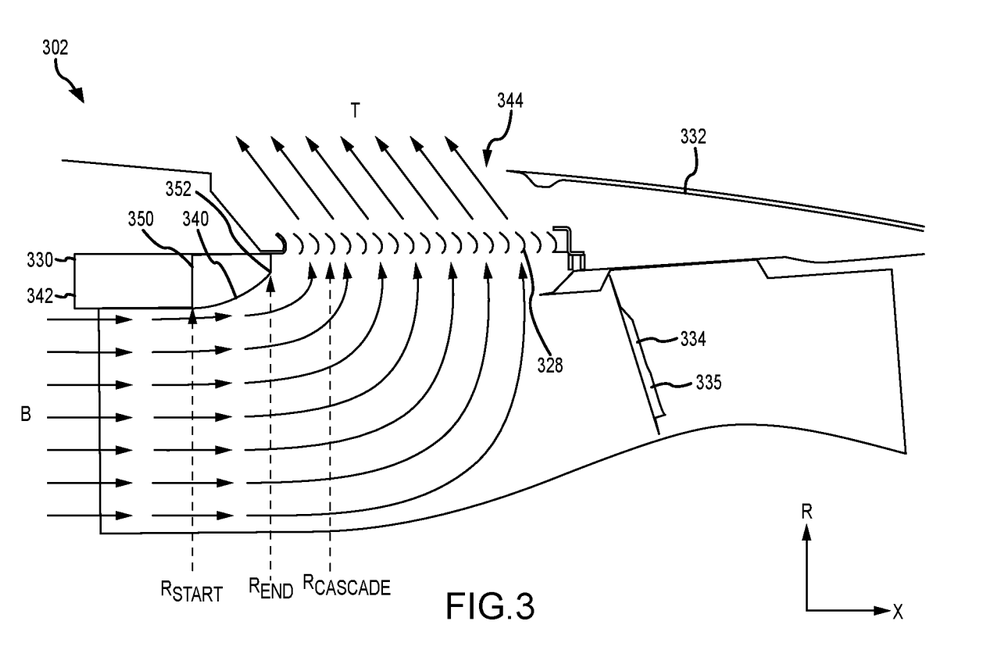
FIG. 3 is a schematic side-sectional illustration of a thrust reverser in a deployed position, in accordance with various embodiments.

Referring now to FIG. 3, a schematic side-sectional view of a thrust reverser 302, similar to the thrust reverser 202 described above with reference to FIGS. 2A and 2B, is provided and illustrated in a deployed position. Similar to the description above, the thrust reverser 302 includes a nacelle fixed structure 330, a nacelle translating structure 332 and a thrust reverser blocker door assembly 334. The nacelle fixed structure 330 includes a bullnose ramp 340 (or a bullnose) and an internal nacelle support structure 342. The bullnose ramp 340 is configured to provide a smooth aerodynamic transition from a bypass flow stream B to a thrust reverser duct 344, which extends axially between the internal nacelle support structure 342 and the nacelle translating structure 332. In various embodiments, the internal nacelle support structure 342 circumscribes and supports the bullnose ramp 340. The internal nacelle support structure 342 also provides a base to which a cascade structure 328, similar to the cascade structure 228 described above with reference to FIGS. 2A and 2B, may be mounted. The cascade structure 328 may thereby project axially aft from the internal nacelle support structure 342 and downstream of the bullnose ramp 340.

When the nacelle translating structure 332 is in the deployed position, the cascade structure 328 is uncovered and located within the thrust reverser duct 344. At the same time, a blocker door 335 of the thrust reverser blocker door assembly 334 is deployed, thereby blocking the bypass flow stream B from exiting the bypass flow stream exhaust and forcing the bypass flow stream to turn radially outward and exit the cascade structure 328 as a reverse thrust flow stream T. As described above, the bullnose ramp 340 provides an aerodynamic surface that functions to smoothly turn the bypass flow stream B toward the cascade structure 328. As described in further detail below, the bullnose ramp 340 may be characterized by a bullnose profile (or a ramp profile) that extends from a forward axial position 350 (or an axial ramp start) to an aft axial position 352 (or an axial ramp end). The bullnose profile may be characterized as a functional relationship between a radius R as a function of axial length X between the forward axial position 350 and the aft axial position 352. Additional parameters that may be used to characterize the bullnose profile and the radial position of the cascade structure 328 include the radius R of the forward axial position 350, $R_{START}$, the radial position at the aft axial position 352, $R_{END}$, and the radius of the cascade structure 328, $R_{CASCADE}$.

Figure 4A:
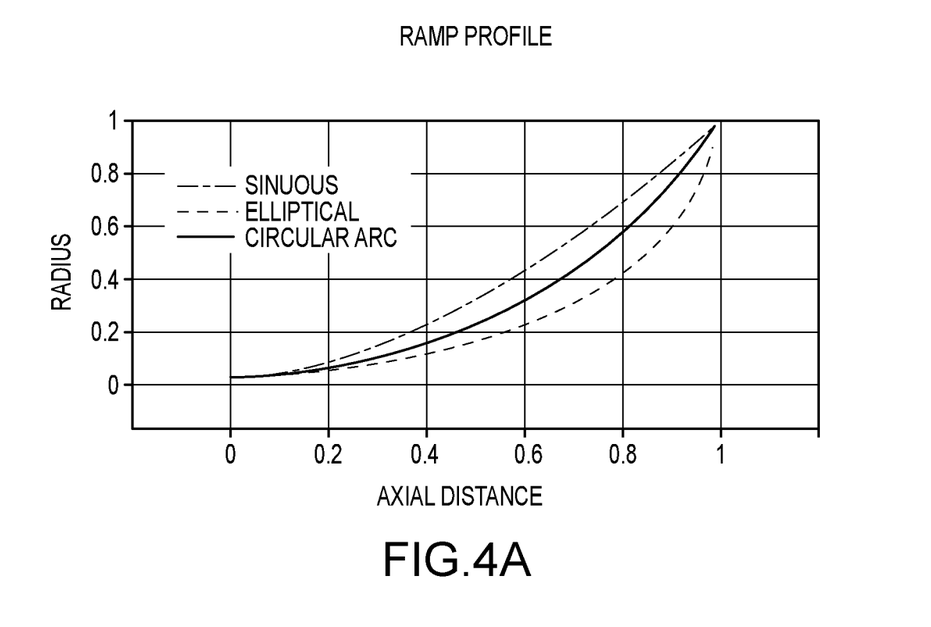
FIGS. 4A and 4B are graphs illustrating ramp profiles and ramp curvatures of various bullnose ramps, in accordance with various embodiments.
Figure 4B:
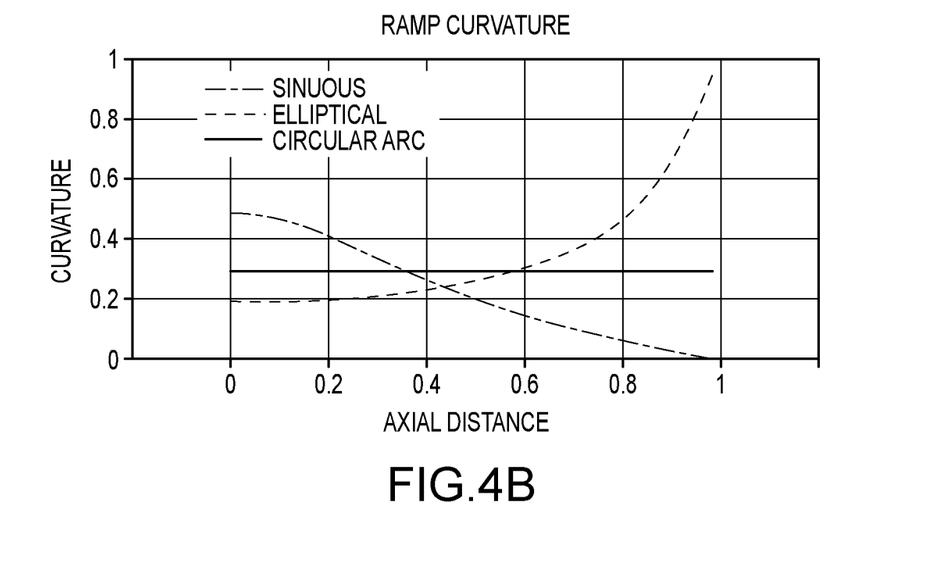

Referring now to FIGS. 4A and 4B, graphs illustrating various ramp profiles and curvature profiles for a bullnose ramp are illustrated. Note the term curvature profile is used to enable the curvature to vary along an axial extent of the ramp profile, rather than be constant along the ramp profile. Referring to FIG. 4A, three mathematical profiles—sinuous, elliptical and circular—are provided. The axial position along the X-axis is normalized to run from zero to unity, with zero corresponding to a forward axial position (e.g., the forward axial position 350) and unity corresponding to an aft axial position (e.g., the aft axial position 352) of a bullnose ramp (e.g., the bullnose ramp 340). Similarly, the radial position along the Y-axis is normalized to run from zero to unity, with zero corresponding to $R_{START}$ and unity corresponding to $R_{END}$ of the bullnose ramp. Referring to FIG.

4B, normalized values of curvature for the three mathematical profiles—sinuous, elliptical and circular—are provided. The axial position along the X-axis is normalized in the same fashion as for FIG. 4A, while the curvature along the Y-axis is suitably normalized to run from zero to unity. An important distinction to recognize from the profiles presented in FIGS. 4A and 4B is the relative degree of curvature for each of the profiles. For example, the curvature of the sinuous profile starts at a start value ($Y \approx 0.50$) at the forward axial position, which is relatively high with respect to an end value ($Y \approx 0.00$) at the aft axial position, where Y indicates the value of curvature on the Y-axis as a function of the axial distance X on the X-axis (or axial extent along the X-axis). Conversely, the curvature of the elliptical profile starts at a start value ($Y \approx 0.20$) at the forward axial position, which is relatively low with respect to an end value ($Y \approx 1.00$) at the aft axial position. As expected, the curvature for the circular arc is constant along the axial extent of the profile. Note the foregoing values of Y refer to the local values of curvature illustrated at FIG. 4B, with the local values of curvature along the X-axis generally understood to mean a reciprocal of the local radii of curvature along the X-axis.

The foregoing profiles may be considered in the design of a bullnose ramp for various thrust reverser configurations. However, current research suggests the profiles are not optimal for maximizing mass flow through a cascade, which, if successful, may result in an engine design configured to experience less drag during flight via shortening the thrust reverser portion of the engine. More specifically, maximizing the mass flow through the cascade enables the use of shorter cascades where flow separation along the bullnose ramp is reduced. Reducing the amount of flow separation along the bullnose ramp, particularly at the forward region of the cascade, enables an increase in the mass flow through the cascade and a more uniform reverse thrust flow stream T (see FIG. 3). Conversely, where substantial flow separation develops along the bullnose ramp and in the region radially inward of the forward region of the cascade, the velocity vectors through the cascade at the forward region of the cascade may be reduced in magnitude, thereby reducing the mass flow through the cascade and thereby reducing the magnitude of the reverse thrust.

Figure 5:
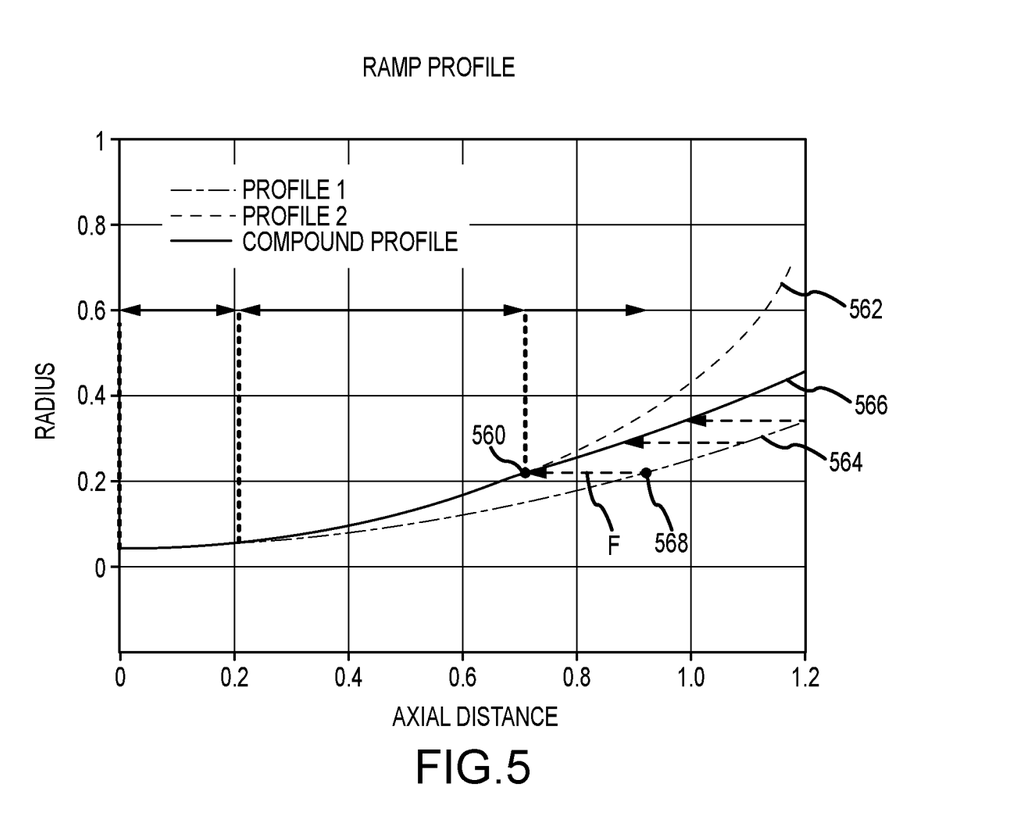
FIG. 5 is a graph illustrating a ramp profile of a bullnose ramp, in accordance with various embodiments.

Referring now to FIG. 5, a compound profile for a bullnose ramp, such as, for example, the bullnose ramp 240 described above with reference to FIGS. 2A and 2B and the bullnose ramp 340 described above with reference to FIG. 3, is illustrated. In various embodiments, solutions to the drawbacks described above, including reducing flow separation along the bullnose ramp, particularly in the region radially inward of the forward region of the cascade, may be accomplished by introducing a transition portion, which, in various embodiments, may be represented by a discontinuity 560, in the profile of the bullnose ramp, with the discontinuity 560 separating a first profile 562 (or a first axial profile) from a second profile 564 (or a second axial profile), where the two profiles exhibit different degrees of curvature along their axial extent. For example, as illustrated at FIG. 5, the first profile 562 ("Profile 1") exhibits a larger or greater degree of curvature along the length of the profile (or a smaller or lesser radius of curvature) than does the second profile 564 ("Profile 2"). Thus, the first profile 562 may be characterized by a first curvature profile or a first set of curvature values that extend along the axial length of Profile 1, while the second profile 564 may be characterized by a second curvature profile or a second set of curvature values that extend along the axial length of Profile 2. A compound profile 566 is constructed by employing the first profile 562 from a forward axial position ($X \approx 0.00$) (e.g., the forward axial position 350 described above with reference to FIG. 3) to an intermediate axial position ($X \approx 0.70$) where the discontinuity is positioned. The compound profile 566 then continues from the discontinuity 560 by incorporating the second profile 564 to an aft axial position ($X \approx 1.00$) (e.g., the aft axial position 352 described above with reference to FIG. 3). In various embodiments, the second profile 564 is incorporated into the compound profile 566 by translating the second profile 564 in a forward direction F, from an axial position ($X \approx 0.90$), where the radial value 568 of the second profile 564 is equal to the radial value of the first profile 562 at the discontinuity 560, to the end of the second profile ($X \approx 1.20$), with the shift, $\Delta X$, being approximately equal to $\Delta X \approx 0.2$, as illustrated. Note each of Profile 1 and Profile 2 may also be characterized by a slope (e.g., the first derivative of the ramp profile) or a rate of change in slope (e.g., the second derivative of the ramp profile) along the axial extent. Note also the ramp profile extending along the transition portion and, in particular, the discontinuity 560, may be characterized as being $C^0$, $C^1$ or $C^2$ continuous.

The manner of translation described above, where the first profile 562 and the second profile 564 exhibit differing values of curvature along their lengths, assures the existence of the discontinuity 560 in the compound profile 566, with the discontinuity being, for example, in the slope of the compound profile 566. Referring briefly to FIG. 2B, the discontinuity may be manifest as a crease 241 that extends along an intersection of the bullnose ramp 240 between a forward portion 243 (represented by the first profile 562) and an aft portion 245 (represented by the second profile 564). As illustrated, the crease 241 extends about the bullnose ramp 240 at an essentially constant axial position. In various embodiments, the axial location of the discontinuity 560 (or the crease 241 illustrated in FIG. 2B), is determined through experimental or computational analysis of the expected axial location of the onset of flow separation following deployment of the thrust reverser. Positioning the discontinuity 560 at an axial location proximate the onset of flow separation allows, or even induces, the flow to separate and then immediately reattach downstream of the discontinuity 560 and on the second profile 564, which, as described above, is characterized by a second set of curvature values having a generally smaller curvature (or larger radius of curvature) than that of a first set of curvature values that characterize the first profile 562. The smaller curvature of the second profile 564 provides a surface less amenable to flow separation throughout the remainder of the compound profile 566, thereby providing a more uniform flow, particularly at the forward region of the cascade, which thereby enables an increase in the mass flow through the cascade and a more uniform reverse thrust flow stream T (see FIG. 3). Note that instead of characterizing the profiles by sets of curvature values, the first and second sets of curvature values might be further characterized by integrating the curvature along the lengths of the first and second profiles (taking care to scale any differences in lengths of the profiles) to obtain scalar results representative of the average curvature of the two profiles.

The foregoing disclosure provides an apparatus and method to improve or increase the mass flow rate through a cascade of a thrust reverser. The bullnose structures disclosed above, which include the surface profiles of the structures generally immediately upstream of the cascade, prevent or impede flow separation in an upstream region of the cascade where a bypass flow stream is being turned or redirected into the bypass duct where the cascade is positioned. The characteristics of the improved flow field (e.g., a flow field exhibiting minimal flow separation from the surface of the bullnose) enables the use of cascades having reduced axial length. A reduction in the axial length of the cascade enables a reduction in the length of the translating sleeve of the thrust reverser, thereby reducing weight of the propulsion system and reducing aerodynamic drag experienced at the outer surface of the nacelle of the propulsion system during flight.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A bullnose ramp for use in a thrust reverser, comprising:
    a forward end and an aft end;
    a forward portion, the forward portion characterized by a first profile having a first slope, the forward portion extending a first length from a forward axial position at the forward end to an intermediate axial position;
    an aft portion, the aft portion characterized by a second profile having a second slope less than the first slope, the aft portion extending a second length from the intermediate axial position to an aft axial position at the aft end; and
    a transition portion positioned along the intermediate axial position, the transition portion defining a change from the first slope to the second slope between the first profile and the second profile, wherein the bullnose ramp extends a third length that is about equal to the combination of the first length and the second length, the first length being about 70% of the third length.

2. The bullnose ramp of claim 1, wherein the change in slope between the forward portion and the aft portion is represented by a discontinuity.

3. The bullnose ramp of claim 2, wherein the discontinuity extends between the forward portion and the aft portion at an essentially constant axial position with respect to an axial direction.

4. The bullnose ramp of claim 3, wherein the forward portion is configured to induce separation of a bypass flow stream from a surface of the bullnose ramp and the aft portion is configured to induce reattachment of the bypass flow stream to the surface of the bullnose ramp.

5. The bullnose ramp of claim 1, wherein the first profile is a first sinuous profile with respect to an axial direction.

6. The bullnose ramp of claim 5, wherein the second profile is a second sinuous profile with respect to the axial direction.

7. The bullnose ramp of claim 6, wherein the first sinuous profile is characterized by a first curvature profile, the first curvature profile extending from the forward axial position of the bullnose ramp to the discontinuity.

8. The bullnose ramp of claim 7, wherein the second sinuous profile is characterized by a second curvature profile, the second curvature profile extending from the discontinuity to the aft axial position of the bullnose ramp.

9. The bullnose ramp of claim 8, wherein the first curvature profile is characterized by a first set of curvature values, the second curvature profile is characterized by a second set of curvature values, and the second set of curvature values is lesser in magnitude than the first set of curvature values.

10. A thrust reverser, comprising:
a cascade; and
a bullnose ramp having a forward end, an aft end, and a first length disposed in an axial direction upstream of the cascade from the forward end to the aft end, the bullnose ramp comprising:
a forward portion, the forward portion characterized by a first profile having a first slope, the forward portion extending a second length from a forward axial position at the forward end to an intermediate axial position, the second length being about 70% of the first length,
an aft portion, the aft portion characterized by a second profile having a second slope less than the first slope, the aft portion extending a third length from the intermediate axial position to an aft axial position at the aft end, and
a transition portion positioned along the intermediate axial position, the transition portion defining a change from the first slope to the second slope between the first profile and the second profile.

11. The thrust reverser of claim 10, wherein the change in slope between the forward portion and the aft portion is represented by a discontinuity in at least one of the change in slope or a rate of change in the change in slope.

12. The thrust reverser of claim 11, wherein the discontinuity extends between the forward portion and the aft portion at an essentially constant axial position with respect to the axial direction.

13. The thrust reverser of claim 12, wherein the forward portion is configured to induce separation of a bypass flow stream from a surface of the bullnose ramp and the aft portion is configured to induce reattachment of the bypass flow stream to the surface of the bullnose ramp.

14. The thrust reverser of claim 10, wherein the first profile is a first sinuous profile with respect to the axial direction and wherein the first sinuous profile is characterized by a first curvature profile, the first curvature profile extending from the forward axial position of the bullnose ramp to the discontinuity.

15. The thrust reverser of claim 14, wherein the second profile is a second sinuous profile with respect to the axial direction and wherein the second sinuous profile is characterized by a second curvature profile, the second curvature profile extending from the discontinuity to the aft axial position of the bullnose ramp.

16. The thrust reverser of claim 15, wherein the first curvature profile is characterized by a first set of curvature values, the second curvature profile is characterized by a second set of curvature values, and the second set of curvature values is lesser in magnitude than the first set of curvature values.

17. An assembly for an aircraft propulsion system, comprising:
a nacelle, the nacelle including a nacelle translating structure;
a cascade disposed within a thrust reverser duct;
a blocker door configured to block a portion of a bypass flow stream; and
a bullnose ramp having a forward end, an aft end, and a first length disposed in an axial direction upstream of the cascade from the forward end to the aft end, the bullnose ramp comprising:
a forward portion, the forward portion characterized by a first axial profile having a first slope, the forward portion extending a second length from a first axial position at the forward end to a second axial position, the second length being about 70% of the first length,
an aft portion, the aft portion characterized by a second axial profile having a second slope less than the first slope, the aft portion extending a third length from the second axial position to a third axial position at the aft end, and
a transition portion positioned along the second axial position, the transition portion defining a change from the first slope to the second slope between the first profile and the second profile.

18. The assembly of claim 17, wherein the change in slope between the forward portion and the aft portion is represented by a discontinuity in at least one of the change in slope or a rate of change in the change in slope.

19. The assembly of claim 18, wherein the change in slope extends between the forward portion and the aft portion at an essentially constant axial position with respect to the axial direction.

20. The assembly of claim 17, wherein the forward portion is configured to induce separation of a bypass flow stream from a surface of the bullnose ramp and the aft portion is configured to induce reattachment of the bypass flow stream to the surface of the bullnose ramp.

\* \* \* \* \*